United States Patent [19]

Marinaccio

[11] Patent Number: 5,064,590
[45] Date of Patent: Nov. 12, 1991

[54] METHOD OF FORMING AN ULTRA-THIN NONLINEAR OPTICAL FILM

[75] Inventor: Paul J. Marinaccio, E. Orleans, Mass.

[73] Assignee: The United States of America as represented by the secretary of the Air Force, Washington, D.C.

[21] Appl. No.: 358,033

[22] Filed: May 26, 1989

[51] Int. Cl.$^5$ .............................................. B29D 7/01
[52] U.S. Cl. ..................................... 264/102; 264/2.6; 264/233; 264/298; 264/334
[58] Field of Search .................. 264/86, 204, 298, 2.6, 264/233, 334, 102

[56] References Cited

U.S. PATENT DOCUMENTS

| | | | |
|---|---|---|---|
| 4,225,700 | 9/1980 | Wolfe et al. | 528/183 |
| 4,711,532 | 12/1987 | Choe | 350/354 |
| 4,746,199 | 5/1988 | Nicoud et al. | 350/354 |
| 4,775,215 | 10/1988 | Teng et al. | 350/96.34 |
| 4,783,151 | 11/1988 | Choe | 350/356 |
| 4,845,150 | 7/1989 | Kovak et al. | 264/147 |
| 4,939,235 | 7/1990 | Harvey et al. | 528/502 |

Primary Examiner—James Lowe
Attorney, Agent, or Firm—William Stepanishen; Donald J. Singer

[57] ABSTRACT

A method of producing a nonlinear optical film from a lyotropic liquid crystalline polymer by diluting the polymer with a dopant to form a concentrated mixture. The concentrated mixture is filtered in a high pressure filtration cell and vacuum degassed. Thin film are formed on plates and are coagulated in water. The thin films are supported on a microporous membrane support and then air dried.

9 Claims, 2 Drawing Sheets

METHOD OF FORMING AN ULTRA-THIN NONLINEAR OPTICAL FILM

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to non-linear optical materials, and in particular to the process of making ordered, polymer nonlinear optical materials.

The state of the art of nonlinear optical materials is well represented and alleviated to some degree by the prior art apparatus and approaches which are contained in the following U.S. Pat. Nos.:

U.S. Pat. No. 4,711,532 issued to Choe on Dec. 8, 1987;
U.S. Pat. No. 4,746,199 issued to Nicoud et al on May 24, 1988;
U.S. Pat. No. 4,775,215 issued to Teng et al on Oct. 4, 1988; and
U.S. Pat. No. 4,783,151 issued to Choe on Nov. 8, 1988.

The Choe patent (532) discloses a novel class of diacetylenic monomers and corresponding polydiacetylenic polymers. In the form of an optically transparent medium with a noncentrosymmetric alignment of molecules, the polymer exhibits exceptional second order nonlinear optical susceptibility effects.

The Nicoud et al patent relates to novel paranitroanilin derivatives usable in non-linear optics and electrooptics, as well as to the preparation process for the same. These derivatives are prepared by reacting one or the two pure optical isomers of 2-(hydroxymethyl)-pyrrolidine with a parahalogenonitrobenzene. The optically pure derivatives can be used in optical or optelectronic devices.

The Teng et al patent describes optical devices with an organic nonlinear optical component which is a transparent medium of a wholly aromatic polymer which exhibits a third order nonlinear optical susceptibility $\chi^{(3)}$ of at least about $1 \times 10^{-12}$ esu. An illustrative embodiment is an ultrafast all-optical gate device with a transparent poly([benzo(1,2-d:4,5-d')bisthiazole-2,6-diyl]-1,4-phenylene) optical component which exhibits a third order nonlinear optical susceptibility $\chi^{(3)}$ of $10 \times 10^{-12}$ esu.

The Choe patent (151) discusses novel polymers which are characterized by a recurring structural unit that contains a pendant quinoid structure and that exhibits nonlinear optical response and are useful in devices such as those used in laser modulation and deflection, frequency conversion, optical communications, integrated circuit fabrication, light valves, and optical switches.

The need for ordered polymers as nonlinear optical materials to provide nonlinear optical effects have emerged at the forefront of research because of their application in optical signal processing, digital optical switching, optical logic, and high speed optical computers. The potential speed (subpicosecond) and large bandwidth capability of optical devices, and their capability for parallel processing of information makes optical signal processing and optical computers very attractive. The requirements of all optical signal processing and optical computing require a combination of properties in materials that favor the development of organic and polymeric materials (4).

The electro-optic properties of conjugated polymeric systems such as the ordered polymers result from electronic ($\pi$-electrons) transitions rather than physical orientational motion of the molecules or molecular segments. The electro-optic properties which result from the interaction of light with the electronic transitions in the polymer, are directly related to the third-order nonlinear susceptibility, ($\chi^{(3)}$). Material requirements for nonresonant third-order processes are extensive $\pi$ delocalization, transparency in the spectral region of interest, a high degree of molecular order, and excellent optical quality of the polymeric material such that there is a minimization of scattering by the incident beam.

Ordered polymers potentially offer the unique advantages of:

1. liquid crystalline order with the possibility of matching electric field direction to orientation of polymer,
2. fast response (subpicosecond),
3. useful optical window for signal processing,
4. high laser damage threshold, and
5. potential to molecularly engineer properties and process into desired architectures, over existing inorganic materials such as lithium niobate and potassium hydrogen phosphate.

PBT is the subject of recent studies because of its high laser damage threshold and a value of $\chi^{(3)}$ of $2.7 \times 10^{-11}$ esu (more than an order of magnitude higher than that of $CS_2$.

The environmental stability of PBT along with its excellent mechanical properties make it an excellent candidate for opto-electronic device applications. To be suitable for applications, however, higher values ($\sim 10^{-9}$ esu) and improved optical quality of films is required. Optical quality will be defined as:

1. optical transparency, and
2. optical flatness.

Improved optical quality in ordered polymers can be obtained in a processing technology which minimizes stress birefringence and void formation.

While the above-cited references are instructive, a need remains to provide a nonlinear optical material which possess the above-identified characteristics and properties. The present invention is intended to satisfy that need.

SUMMARY OF THE INVENTION

The present invention describes the method of producing ordered polymers as nonlinear optical materials. Organic polymeric materials with highly conjugated electron systems exhibit potentially useful third order nonlinear optical (NLO) properties. Ordered polymers, in particular, poly-p phenylene benzobisthiazole (PBT), have a high laser damage threshold and a value of $\chi^{(3)}$ which is over an order of magnitude higher than that of carbon disulfide, $CS_2$. PBT also possesses exceptional environmental stability, excellent mechanical properties, and liquid crystalline order which allows for the possibility of matching the electric field direction to the orientation of the polymer.

It is one object of the present invention, therefore, to provide an improved method for producing nonlinear optical materials.

It is another object of this invention to provide an improved method for producing nonlinear optical materials which have a liquid crystalline order with the possibility of matching electric field direction to orientation of polymer.

It is still another object of this invention to provide an improved method for producing nonlinear optical materials which provide a fast response (subpicosecond).

It is yet another object of this invention to provide an improved method for producing nonlinear optical materials having a useful optical window for signal processing.

It is still another object of this invention to provide an improved method for producing nonlinear optical materials which have a high laser damage threshold.

It is an even further object of this invention to provide an improved method for producing nonlinear optical materials that have the potential to molecularly engineer properties and process into desired architectures.

These and other advantages, objects and features of the invention will become more apparent after considering the following description taken in conjunction with the illustrative embodiment in the accompanying drawings.

DETAILED DESCRIPTION OF THE PREFERRED EMBODIMENT

The development of polymer synthesis procedures has involved the use of $P_2O_5$ additions which has resulted in a high molecular weight polymer dope that consists of a complex mixture of PBT in polyphosphoric acid (PPA). This dope has been developed to allow fibers to be spun by modified wet spinning techniques. A film process has been developed for producing high strength, high temperature (>600° C.) biaxial film from the lyotropic liquid crystalline polymer. This polymer and the film process was originally developed for the purpose of using it as an aerospace structural material.

Figure 1:
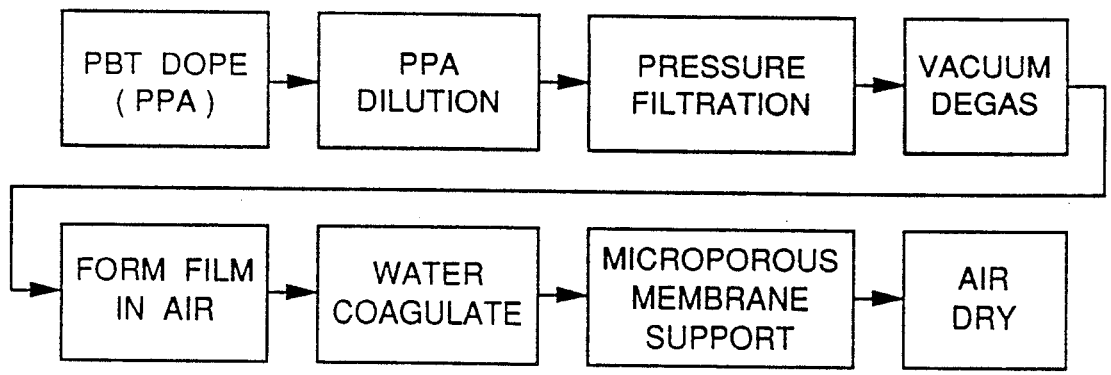
FIG. 1 is a block diagram of the step for the PBT thin film deposition process according to the present invention.

In order for PBT to be used as a potential waveguide material, it is necessary to develop the ability to produce ultra-thin films of PBT for nonlinear optical applications. A block diagram of this thin film deposition process is shown in FIG. 1.

The process involves dilution of the PBT PPA dope with additional PPA. The starting material for this process is: PBT #2894-64 from SRI; 5.5 wt. % PBT in PPA; $[\eta]_{MSA} = 18$ dL/g. A quantity of this dope was blended with additional diluent PPA to a concentration of 0.78 wt. % PBT with a high shear mixer under elevated temperatures. This material was then filtered through a high pressure AMICON 401 S filtration cell, vacuum degassing the concentrated mixture at an elevated temperature and subsequently diluted to 0.45 wt. % PBT with MSA. The thin films were deposited on clean glass plates with a bird-type multiple clearance thin film applicator. Once coated onto glass, the films were coagulated in water. After 5 to 10 min. the films spontaneously lift from the glass and float freely in the water. They are then allowed to soak for 24 hours to allow any MSA or PPA to diffuse out of the water-swollen film. While in the water, the films are optically transparent and yellow. Samples of the film were then mounted on glass slides or in an O-ring. Films as thin as 0.2 $\mu$ have been prepared using these methods. These thin films can be picked up on any suitable substrate such as a glass slide or a microporous membrane support and then dried. The surface of the thin film which was on a nylon support membrane was examined with a scanning electron microscope. The nylon support membrane appears as a fibrillar structure and the PBT film appears as a smoother structure. The edge view of the PBT film reveals that the thickness is ~0.25$\mu$.

Closer examination of the thin film reveals what appears to be spherulite-like structures on a smooth background. This film was judged to be largely isotropic judging by the absence of birefringence under crossed polarizers. To the naked eye, these films are transparent yellow although they have a slight haziness to them, most likely as a result of the sperulite-like structures.

Although it was demonstrated that thin films could be deposited from dilute solutions of PBT in PPA, it was not possible to accurately measure $\chi(3)$ for these films because of extensive scattering defects present in the film. The extent of these defects must be minimized during the formation of the thin films.

Figure 2:
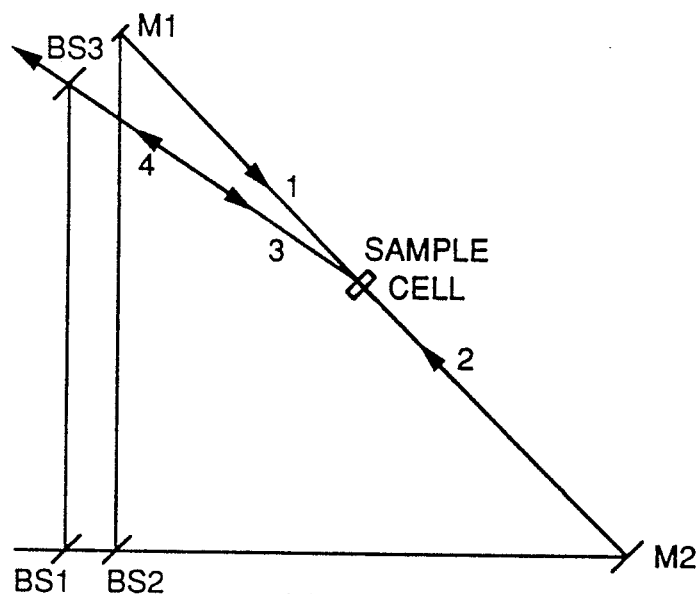
FIG. 2 is a schematic representation of the degenerate four waving mixing process.

Turning now to FIG. 2, there is shown a third-order non-linear optical process ($\chi^{(3)}$ process) in which three laser beam units, BS1, BS2, BS3 provide three inputs: $I(W_1)$, $I(W_2)$, $I(W_3)$ interact in a nonlinear medium to produce a coherence field at a phase matched angle at a frequency $W_4$. Two important $\chi^{(3)}$ process are: a) third harmonic generation, and b) degenerate four wave mixing (DFWM). In the third harmonic generation $W_1 = W_2 = W_3 = W$ and $W_4 = 3W$. In the DFWM process $W_1 = W_2 = W_3 = W_4$. This $\chi^{(3)}$ process has received more attention because of its application to optical logic, bistability, and dynamic holography beams $W_1$, $W_2$, $W_3$ and $W_4$ are depicted in FIG. 2 as beam paths 1, 2, 3 and 4 wherein the characters (1, 2, 3, 4) are placed near the arrowhead of the laser beam to identify it and its direction. Mirrors, M1, M2 are utilized to direct laser beams to the sample cell which comprises a thin film that is under test. In this case $W_1$ and $W_2$ are counter-propagating, the phase matching condition requires that the DFWM signal ($W_4 = W_1 = W_2 = W_3$) be counter-propagating to $W_3$ as shown in FIG. 5-8. In other words, the beam $W_3$ reverses its path generating a phase conjugate. The use of DFWM for measuring $\chi^{(3)}$ is a preferred method. The advantage of this method over the third harmonic generation method is that one can get both values of $\chi^{(3)}$ and its response time. The DFWM signal can arise from many contributions, however, such as (1) electronic third-order nonlinear susceptibility (electronic contribution to $\chi^{(3)}$), (2) orientational third-order susceptibility, (3) electrostriction, and (4) thermal grating.

On the basis of time response and effect of relative polarization of the three beams the various contributions to DFWM can be separated. The $\pi$ electron contribution to the DFWM signal has the fastest response time, being in subpicoseconds. When the frequency of the laser beam is far from any electronic resonance, the DFWM signal derived from electronic contributions is a nonresonant contribution due to the resonant state. In order to separate electronic nonresonant contributions from other contributions, one needs to conduct DFWM experiments with ultrashort laser pulses.

The laser system which is used for this investigation is comprised of a CW mode-locked Nd-Yag laser (Spectra-Physics, Model 3000), the output of which after frequency doubling sync pumps a dye laser (Spectra-Physics, Model 375). The output from the sync pumped dye laser is fed into an amplifier (Quanta Ray, Model PDA), which is pumped by a 20 Hz pulsed Nd-Yag laser (Quanta Ray, Model DCR-2A). The output from the amplifier is a pulse width $\sim 8$ psec and energy $\sim 0.5$ mJ. For subpicosecond response study, a saturable absorber DQOCI solution is added to the dye in the sync pumped dye laser which shortens its pulses to $\sim 350$ fsec. However, the pulse broadens about 3 times after the amplification. A backward pump wave geometry will be used for the DFWM experiment. In this geometry, the output from the amplifier after being appropriately attenuated by neutral density filters is split in two. One portion is sent through the optical delay line and forms the backward pump wave. The other portion is again split in two beams of unequal intensity: a weak probe beam and stronger forward pump beam; these two are crossed at an angle of $\sim 5$ deg in the film.

In order to develop optical switching devices using nonlinear optical processes in an optical waveguide, the intensity-dependent refractive index for a specific guided mode is utilized. The relevant parameters for optimal device performance are the attenuation, $\alpha$; homogeneity of the waveguide defined by the refractive index variation, $\Delta n$; and optical flatness so that the waveguide supports the propagation of a specific guided mode. The requirement for $\alpha$, which limits throughput, is $\alpha < $ few cm$^{-1}$. The refractive index homogeneity requirement is $\Delta n < n_2 I$ where $n_2$ is the intensity dependent refractive index. For PBT $|2| \sim 10^{-7}$ cm$^2$/Mw, but it is expected that $n_2 I$ may reach a saturation value of $10^{-3}$. Therefore, the refractive indexed variation $\Delta n$ due to inhomogeneity must be less than $10^{-4}$ which requires the thin film to be highly uniform. For a waveguide to support a specific guided mode, the film thickness must have a uniformity (optical flatness) of at least $\lambda/10$.

The present process has produced ordered polymers, in particular, PBT, which have potential as $\chi^{(3)}$ materials. However, this application in optical devices is limited to some degree by the optical defects in the film which cause light scattering. Some degree of process refinement will be necessary to provide a simple and reliable method to make defect-free ordered polymer film with improved optical properties and enhanced values of $\chi^{(3)}$. Optically bistability has stimulated great interest for its applications in future fabrication of optical logic and memory elements, pulse shapers, limiters, clippers, and discriminators, etc. An optically bistable system exhibits two steady output states for the same input intensity over some range of input. Since materials that fulfill the requirement of an ideal optically bistable device do not yet exist, there is a great need for high nonlinearity materials with low absorption coefficient and good optical quality. The ordered polymers films which may be produced by the present invention are of potential use in such devices because of their high $\chi^{(3)}$, subpicosecond response and ease of fabrication.

Figure 3:
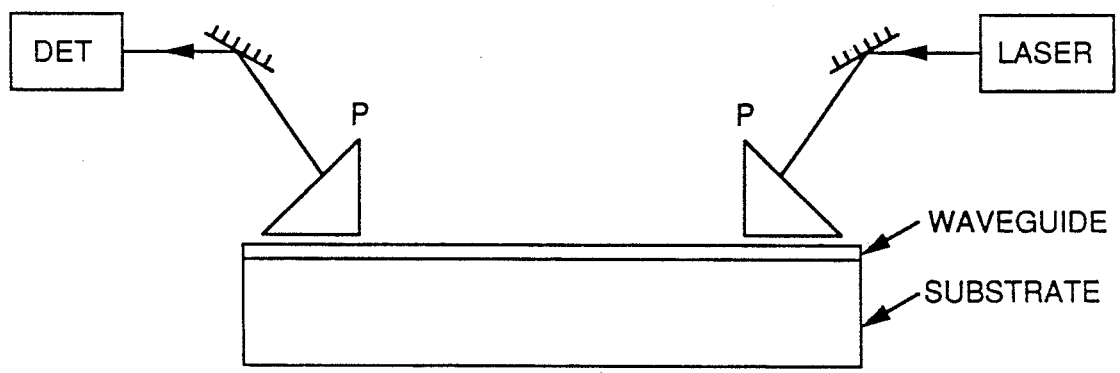
FIG. 3 is a schematic diagram of the planar waveguide configuration for measuring optical quality of the thin film.

The measurement of the optical quality of the film will be achieved by using both a planar waveguide and a surface plasmon configuration. In FIG. 3, there is shown the planar waveguide configuration in which a thin film of polymer ($\sim 1 \mu$ thickness) is deposited on a glass slide. Prism coupling will be used to guide a HeNe laser line into the film. The requirement is that the refractive index of the prism should be higher than that of the polymer. For this purpose, a prism which has a refractive index of 2.4, will be used. A measurement of the propagation distance in the waveguide would give us a rough estimate of the attenuation, o in the waveguide to qualitatively assess the optical quality of the films. For a more quantitative estimate on promising films, the coupling efficiency will be determined as a function of propagation distance by measuring both input and output powers. The output power will be measured by using a second prism to decouple the beam from the waveguide as shown in FIG. 3.

Figure 4:
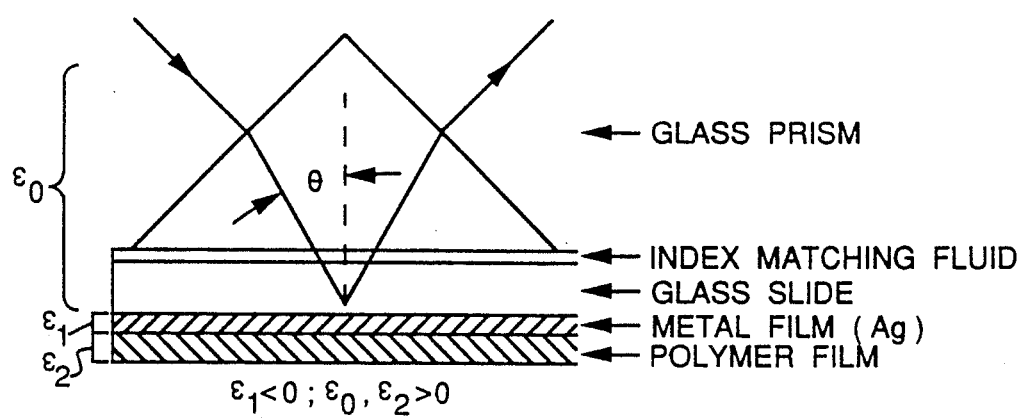
FIG. 4 is a schematic diagram of the surface plasmon configuration for measuring optical quality.

The surface prism coupling will assist in evaluating the uniformity of the film. For this study, the polymer film will be coated on a $\sim 400$Å thick silver film deposited on a glass slide. A prism coupling in the Kretchman geometry as illustrated in FIG. 4 will be used to couple light to a surface plasmon wave. The coupling is defined by an incident angle at which a dip in reflectivity occurs. The surface plasmon propagation distance is about $10\mu$. From the dip in reflectivity, one can determine the refractive index as well as the thickness of the film averaged, of course, over a spot of $10\mu$ size. By translating the film to measure the refractive index and the film thickness at various spots one can map out the spatial homogeneity of the film.

Refinement of the deposition procedure will involve two levels of development. The first level will make the following improvements:

Improvements in deposition process to minimize particulate impurities

Slower coagulation times to reduce the tendency to form liquid crystalline defects Reducing void formation and stress birefringence.

The second level of development will utilize an electric field (or magnetic field) orientation process concurrent with slow evaporation of solvent from the deposited film. This process will result in orientation of the ordered polymer chains and minimization of voids which are usually formed during coagulation. The presence of voids in the fibril structure is undesirable because they will ultimately contribute to scattering losses.

Although the invention has been described with reference to a particular embodiment, it will be understood to those skilled in the art that the invention is capable of a variety of alternative embodiments within the spirit and scope of the appended claims.

What is claimed is:

1. A method of forming an ultra-thin nonlinear optical film which is performed in the following sequence of steps:
  a) diluting a lyotropic liquid crystalline polymer with a dopant to form a complex mixture,
  ·b) blending said complex mixture with additional dopant to form a concentrated mixture,
  c) filtering said concentrated mixture through a high pressure filtration cell,
  d) vacuum degassing said concentrated mixture at an elevated temperature,
  e) forming a thin film in air on a plate, f) coagulating said thin film in water, said thin film floating freely in the water after a predetermined time, to allow said dopant to diffuse out of said thin film, g) picking said thin film up on a support substrate, and h) drying said thin film in air.

2. A method of forming a nonlinear optical film as described in claim 1 including the further step of:

after said thin film floats freely in water, soaking said thin film in water for a predetermined length of time to diffuse any dopant remaining in said thin film.

3. A method of forming a nonlinear optical film as described in claim 1 wherein said lyotropic crystalline polymer comprises polyphenylene benzobisthiazole (PBT) and said dopant comprises polyphosphoric acid (PPA).

4. A method of forming a nonlinear optical film as described in claim 1 wherein said additional dopant comprises polyphosphoric acid.

5. A method of forming a nonlinear optical film as described in claim 1 wherein said additional dopant comprises trifluoromethane sulforic acid (MSA).

6. A method of forming a nonlinear optical film as described in claim 1 wherein said complex mixture comprises 5.5 wt. % PBT in PPA.

7. A method of forming a nonlinear optical film as described in claim 1 wherein said concentrated mixture comprises a concentration of 0.8 wt. % PBT.

8. A method of forming a nonlinear optical film as described in claim 7 further including the step of:

after filtering said concentrated mixture, diluting said concentrated mixture with MSA to a concentration of 0.45 wt. % PBT.

9. A method of forming a nonlinear optical film as described in claim 1 wherein said thin film has a thickness of approximately $0.25\mu$.

* * * * *